March 23, 1926.                F. G. JEFFRIES ET AL                1,577,467
                                    TOOL HOLDER
                                Filed April 9, 1924
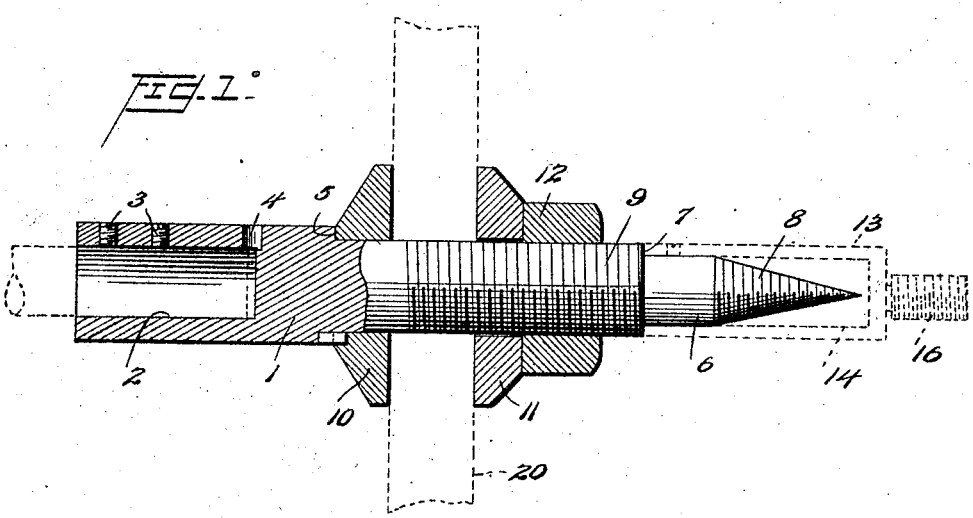
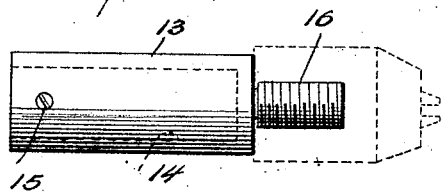
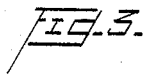
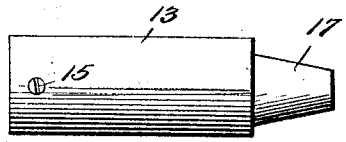
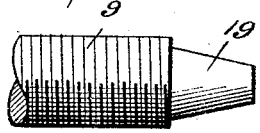

Patented Mar. 23, 1926.

1,577,467

UNITED STATES PATENT OFFICE.

FRANK G. JEFFRIES AND FREDERICK A. LAVEDAN, OF COLLEGE POINT, NEW YORK.

TOOL HOLDER.

Application filed April 9, 1924. Serial No. 705,219.

*To all whom it may concern:*

Be it known that FRANK G. JEFFRIES and FREDERICK A. LAVEDAN, citizens of the United States, residing at College Point, in the county of Queens and State of New York, have invented certain new and useful Improvements in Tool Holders, of which the following is a specification.

Our invention relates to a tool holder which is adapted to be connected to any rotary shaft, such as a lathe spindle, saw mandrel, drilling machine, electric motor shaft and the like, either horizontal or vertical.

One of the objects of the invention is to provide such a device to which can be attached a variety of tools such as emery wheels, buffing wheels, saws, drill chucks and similar tools.

Referring to the drawing for a more complete disclosure of the invention:

Fig. 1 is a longitudinal section of the tool holding attachment.

Figs. 2 and 3 are elevations showing special attachments for the drill chuck.

Figs. 4 and 5 are modifications of one end of the tool holding attachment.

The attachment comprises a spindle 1 and is made out of one solid piece of stock and is provided with a bore 2 at one end, which can fit on either a cylindrical or tapered end of a rotary shaft. If the end of the rotary shaft is screw threaded, then the bore would be tapped to fit the same. For holding the attachment on the rotary shaft, set screws 3 are provided. A hole 4 is provided which communicates with the bore 2 to release compressed air formed in placing the attachment on the shaft. This hole can also be used for releasing the attachment by driving a tapered key into it and into contact with the end of the rotary shaft.

The attachment is provided with a reduced threaded portion 9 forming a flange 5, and a further reduced portion 6 providing a flange 7. The portion 6 may be provided at its end with a tapered threaded portion 8. Instead of making the tapered thread 8 on the end of the attachment, the end may be made as shown in Figs. 4 and 5.

Mounted on the portion 9 of the attachment are clamps 10 and 11 for holding emery wheels, buffs, saws and similar devices. The clamp 10 is keyed to the spindle 1 and the clamp 11 is loosely mounted thereon. In threaded engagement with the portion 9 is a nut 12 in contact with the clamp 11 by means of which on screwing up the nut, the implement 20 between the clamps is securely held in position, so as to rotate with the spindle.

A buffing wheel may be screwed onto the tapered threaded portion 8 of the spindle to rotate therewith.

When it is desired to use a drill chuck instead of a buffing wheel, the attachment shown in Figs. 2 and 3 may be used and which comprises a spindle 13 having a bore 14 adapted to fit over the portion 6 and be held in position thereon by the set screw 15. At one end, there may be a threaded portion 16 for engaging the drill chuck or a tapered portion 17.

Instead however of a separable attachment for this purpose, the tapered end 8 for the buffing wheel may be dispensed with and a threaded portion 18 similar to portion 16 and a tapered portion 19 similar to portion 17 may be provided.

From the above description it will be apparent that we have produced a device of the character specified, which possesses all the features enumerated as desirable, and while we have illustrated and described the preferred form of the invention, it will be understood that we reserve the right to all changes properly falling within the spirit and scope of the appended claim.

Therefore, what we claim as new, and desire to secure by Letters Patent of the United States, is:

A tool holder comprising a spindle made of a single piece of stock and provided with a bore at one end adapted to fit on the end of a rotary shaft, the said spindle being provided with a reduced threaded intermediate portion forming thereby a flange with the main portion, and a further reduced threaded end portion, the said intermediate threaded portion adapted to engage a nut for clamping the rotary tool in position thereon against the said flange, the said reduced threaded end portion adapted to detachably engage another rotating tool.

In testimony whereof we affix our signatures.

FRANK G. JEFFRIES.
FREDERICK A. LAVEDAN.